US008626681B1

(12) United States Patent
Jurca et al.

(10) Patent No.: US 8,626,681 B1
(45) Date of Patent: Jan. 7, 2014

(54) TRAINING A PROBABILISTIC SPELLING CHECKER FROM STRUCTURED DATA

(75) Inventors: Radu Jurca, Adliswil (CH); Pascal Fleury, Zurich (CH); Bruce Winston Murphy, Bern (CH)

(73) Assignee: Google Inc., Mountain View, CA (US)

( * ) Notice: Subject to any disclaimer, the term of this patent is extended or adjusted under 35 U.S.C. 154(b) by 261 days.

(21) Appl. No.: 12/984,484

(22) Filed: Jan. 4, 2011

(51) Int. Cl.
*G06F 15/18* (2006.01)
(52) U.S. Cl.
CPC ................................... *G06F 15/18* (2013.01)
USPC .......................................................... 706/12
(58) Field of Classification Search
None
See application file for complete search history.

(56) References Cited

U.S. PATENT DOCUMENTS

| | | | | |
|---|---|---|---|---|
| 5,848,373 | A * | 12/1998 | DeLorme et al. | 701/455 |
| 5,883,986 | A * | 3/1999 | Kopec et al. | 382/310 |
| 5,907,821 | A | 5/1999 | Kaji et al. | |
| 6,184,823 | B1 * | 2/2001 | Smith et al. | 342/357.31 |
| 6,292,771 | B1 * | 9/2001 | Haug et al. | 704/9 |
| 7,076,505 | B2 * | 7/2006 | Campbell | 701/438 |
| 7,082,443 | B1 * | 7/2006 | Ashby | 342/357.41 |
| 7,092,926 | B2 * | 8/2006 | Cerrato | 706/48 |
| 7,096,117 | B1 * | 8/2006 | Gale et al. | 701/532 |
| 7,197,500 | B1 * | 3/2007 | Israni et al. | 707/809 |
| 7,340,460 | B1 | 3/2008 | Kapur et al. | |
| 7,392,278 | B2 * | 6/2008 | Chen et al. | 1/1 |
| 7,428,533 | B2 * | 9/2008 | Kapur et al. | 1/1 |
| 7,593,904 | B1 * | 9/2009 | Kirshenbaum et al. | 706/12 |
| 7,599,988 | B2 * | 10/2009 | Frank | 709/203 |
| 7,620,628 | B2 * | 11/2009 | Kapur et al. | 1/1 |
| 8,086,591 | B2 * | 12/2011 | Scott et al. | 707/708 |
| 8,195,653 | B2 * | 6/2012 | Dandekar et al. | 707/724 |
| 8,201,078 | B2 * | 6/2012 | Boyer et al. | 715/221 |
| 2003/0163375 | A1 * | 8/2003 | Dombrowski et al. | 705/14 |
| 2003/0217052 | A1 | 11/2003 | Rubenczyk et al. | |
| 2004/0008225 | A1 * | 1/2004 | Campbell | 345/764 |
| 2004/0078750 | A1 * | 4/2004 | Frank | 715/500 |
| 2004/0141354 | A1 | 7/2004 | Carnahan | |
| 2004/0249637 | A1 * | 12/2004 | Baker | 704/239 |
| 2004/0267718 | A1 | 12/2004 | Milligan et al. | |
| 2005/0066050 | A1 * | 3/2005 | Dharamshi | 709/232 |
| 2005/0182647 | A1 * | 8/2005 | Saenz et al. | 705/1 |
| 2005/0278378 | A1 * | 12/2005 | Frank | 707/104.1 |

(Continued)

OTHER PUBLICATIONS

Cui et al, "Probabilitstic Query Expansion Using Query Logs," WWW 2002, May 7-11, 2002, Honolulu, Hawaii, USA.*

(Continued)

*Primary Examiner* — Kakali Chaki
*Assistant Examiner* — Fuming Wu
(74) *Attorney, Agent, or Firm* — Fenwick & West LLP

(57) ABSTRACT

A spelling system derives a language model for a particular domain of structured data, the language model enabling determinations of alternative spellings of queries or other strings of text from that domain. More specifically, the spelling system calculates (a) probabilities that the various query entity types—such as STREET, CITY, or STATE for queries in the geographical domain—are arranged in each of the various possible orders, and (b) probabilities that an arbitrary query references given particular ones of the entities, such as the street "El Camino Real." Based on the calculated probabilities, the spelling system generates a language model that has associated scores (e.g., probabilities) for each of a set of probable entity name orderings, where the total number of entity name orderings is substantially less than the number of all possible orderings. The language model can be applied to determine probabilities of arbitrary queries, and thus to suggest alternative queries more likely to represent what a user intended.

20 Claims, 4 Drawing Sheets

(56) References Cited

U.S. PATENT DOCUMENTS

| | | |
|---|---|---|
| 2006/0122979 A1* | 6/2006 | Kapur et al. ............... 707/3 |
| 2007/0067157 A1 | 3/2007 | Kaku et al. |
| 2008/0010262 A1* | 1/2008 | Frank ............... 707/3 |
| 2008/0027985 A1 | 1/2008 | Kasperkiewicz et al. |
| 2008/0243838 A1* | 10/2008 | Scott et al. ............... 707/5 |
| 2008/0288314 A1* | 11/2008 | Dombrowski et al. ............... 705/7 |
| 2008/0288338 A1* | 11/2008 | Wiseman et al. ............... 705/14 |
| 2009/0089261 A1* | 4/2009 | Leher et al. ............... 707/3 |
| 2009/0164428 A1* | 6/2009 | Green et al. ............... 707/3 |
| 2009/0254512 A1* | 10/2009 | Broder et al. ............... 707/2 |
| 2009/0281792 A1* | 11/2009 | Green et al. ............... 704/9 |
| 2010/0151816 A1* | 6/2010 | Besehanic et al. ............... 455/405 |
| 2010/0169026 A1* | 7/2010 | Sorenson et al. ............... 702/20 |
| 2010/0174703 A1* | 7/2010 | Dandekar et al. ............... 707/722 |
| 2010/0306249 A1* | 12/2010 | Hill et al. ............... 707/769 |
| 2011/0040695 A1* | 2/2011 | Wasicek et al. ............... 705/320 |
| 2011/0055041 A1* | 3/2011 | Shaw et al. ............... 705/26.3 |
| 2011/0093467 A1* | 4/2011 | Sharp et al. ............... 707/741 |
| 2011/0270820 A1* | 11/2011 | Agarwal ............... 707/709 |
| 2011/0296237 A1* | 12/2011 | Mandagere et al. ............... 714/15 |
| 2012/0016663 A1* | 1/2012 | Gillam et al. ............... 704/9 |
| 2013/0007256 A1* | 1/2013 | Prieditis ............... 709/224 |
| 2013/0031033 A1* | 1/2013 | Prieditis ............... 706/12 |

OTHER PUBLICATIONS

Qingqing Gan, et al, "Analysis of Geographic Queries in a Search Engine Log," LocWeb 2008, Apr. 22, 2008 Beijing, China.*

Hang Cui, et al, "Probabilitic Query Expension Using Query Logs," WWW 2002, May 7-11, 2002, Honolulu, Hawaii, USA.*

* cited by examiner

TRAINING A PROBABILISTIC SPELLING CHECKER FROM STRUCTURED DATA

BACKGROUND

1. Field of Art

The present invention generally relates to the field of data processing, and more specifically, to methods of training spelling checkers for use in a domain having structured corpora of data, such as geographic name data.

2. Background of the Invention

Users of computer systems often input misspelled data. For example, in the domain of geographic entity names, users frequently enter misspelled queries for locations, such as a query for map data associated with the city of "New Yrk" or of "Amstedam, the Netherlands."

Some conventional spelling checkers for use in other data domains store all combinations of validly-spelled words along with the associated probabilities that the various combinations are what the user intended. The set of combinations is deemed a language model providing a representation of the permissible combinations of words in the relevant data domain. Although such an approach is feasible in certain domains such as those of natural languages, where the number of valid word combinations is constrained by comparatively restrictive grammatical rules governing word ordering, it is not practically possible in other domains.

For example, in the domain of geographic entity names, there is a very large vocabulary of possible names, such as tens of thousands of distinct cities (e.g., "New York" or "Paris"), streets (e.g., "Main Street"), and landmarks (e.g., "Eiffel Tower"), hundreds of countries (e.g., "United States" or "France"), and so on. A geographic query can contain any number of the different types (e.g., street, city, or country), and the types can be arranged in different orders based on the different language conventions of the possible users (e.g., "STREET, CITY, STATE" in American English, and "CITY, DISTRICT, STREET in Russian). Additionally, the different geographic entities of a geographic query can have multiple names, such as various abbreviations (e.g., "U.S.", as well as "United States"), and/or various spellings in different languages (e.g., "Etats Unis" in French and "United States" in English). Similarly, a translation of a geographic name in one language (e.g., Chinese) can have multiple equally valid spellings in another language (e.g., English) and thus an entire set of associated misspellings. Thus, conventional techniques cannot create useful language models for domains such as that of geographic entity names, where the number of valid word combinations is extremely large.

SUMMARY

A computer implemented, automated spelling system derives a language model for a particular domain of structured data, the language model enabling determinations of alternative spellings of queries or other strings of text from that domain. In various embodiments, the spelling system calculates (a) probabilities that the various query entity types—e.g., STREET, CITY, or STATE for queries in the geographical domain—are arranged in each of the various possible orders, and (b) probabilities that an arbitrary query references given particular ones of the entities, such as the street "El Camino Real." Based on the calculated probabilities, the spelling system generates a language model that has associated scores (e.g., probabilities) for each of a set of probable entity name orderings, where the total number of entity name orderings is substantially less than the number of all possible orderings. The spelling system has application in any domain where the number of valid word combinations is extremely large.

For example, in one embodiment specific to the domain of geographic entity names, the spelling system calculates (a) a template distribution comprising probabilities of occurrence in an arbitrary query for the various possible orderings of geographic entity types (e.g., <ADDRESS, CITY, STATE> and <ADDRESS, CITY, ZIPCODE>), and (b) a location distribution comprising probabilities that an arbitrary query refers to the regions corresponding to the various geographic entities in a domain database (e.g., the probabilities that a query refers to the specific city "New York" in New York State, or to the street California Street in Mountain View, Calif.). Based on the probabilities within the template distribution and the geographic distribution, the spelling system generates a language model that stores a set of pairs of geographic entities and an associated probability score for each.

In one embodiment, the spelling system further computes conditional probabilities of different entity name combinations based on the different pairs of entities in the language model and their associated probability scores. The spelling system can then use the computed conditional probabilities to generate, for a given user query, alternative queries that the user is more likely to have intended. For example, the spelling system might compute the conditional probability that the word "York" will occur, given that the word "New" has already occurred in a geographic query, and later use this conditional probability when determining alternative geographic queries.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Architecture

Figure 1:
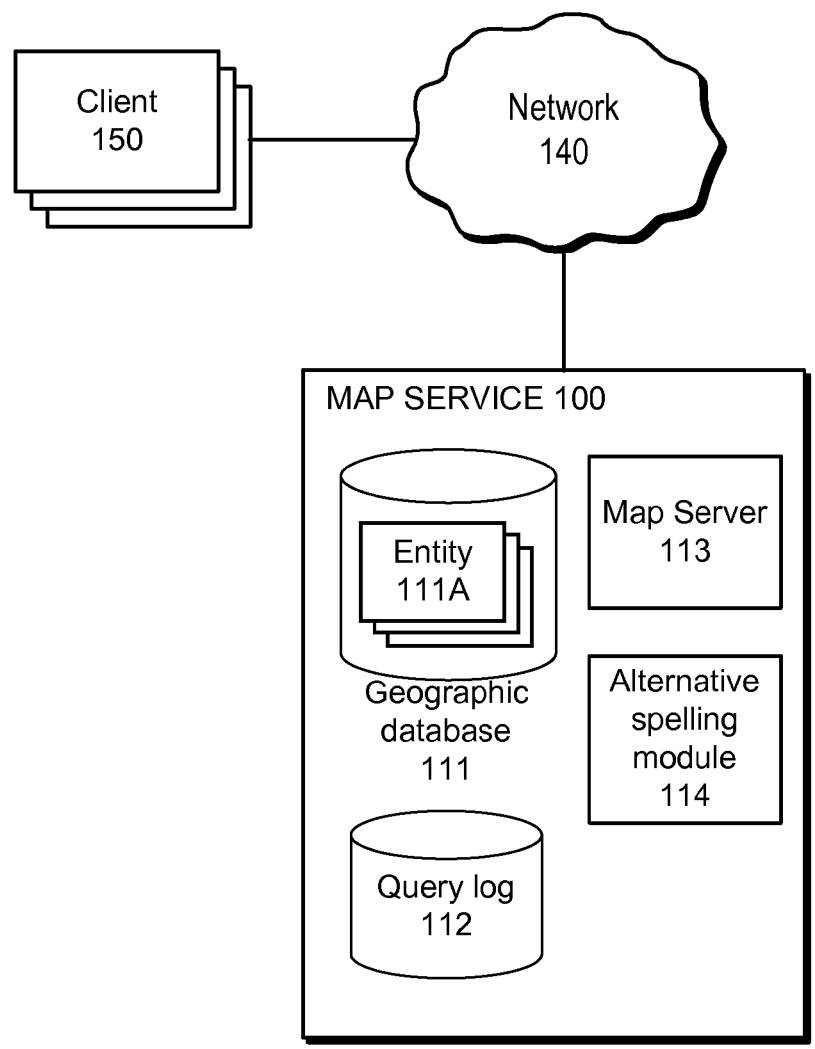
FIG. 1 is a block diagram of a geographic information and mapping system in which alternative spelling analysis can be performed.

FIG. 1 is a block diagram of a system in which alternative spelling analysis can be performed, according to one embodiment. The alternative spelling analysis provided by various embodiments can be performed for structured data—i.e., data that has well-defined semantics—in many different domains. However, for purposes of example, FIG. 1 sets forth a specific example in the domain of geographical data employed by a geographic information and mapping system. A map service 100 represents a system such as that of GOOGLE MAPS that stores and provides map data to clients such as the client devices 150 over a network 140.

Client devices 150 are computing devices that execute client software, e.g., a web browser or built-in client application, to connect to the map server 113 of the map service 100 via a network 140 and to display map data. The client device 150 might be, for example, a personal computer, a personal digital assistant, a cellular, mobile, or smart phone, or a laptop computer.

The network 140 represents the communication pathways between the client devices 150 and the map service 100. In one embodiment, the network 140 uses standard Internet communications technologies and/or protocols. Thus, the network 140 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The map service 100 includes a geographic database 111 that stores data for the geographic domain, such as map entities like countries, cities, streets, and the like. Entities are described in further detail below.

The map service 100 further includes a map server that receives geographic queries from the clients 150 and in response provides appropriate data from the geographic database, and a query log 112 storing prior user queries received by the map server. A geographic query can be in form of an entity name (e.g., "Eiffel Tower" or "Los Angeles"), a complete or partial address (e.g., "1600 Pennsylvania Avenue"), or a free text (e.g., "lake near Chicago"), or other queries for which the relevant information is geographic in nature.

The map service 100 additionally includes an alternative spelling module 114 that analyzes the data in the geographic database 111 and the query log 112 and generates a geographic model that can be used, for example, to suggest alternative spellings of queries, e.g., where the user entered a query containing a misspelled name. In another embodiment, the alternative spelling module is not part of the map service 100 itself, but instead is located remotely from the map service 100 and accesses data such as the geographic database 111 and/or the query log 112 via the network 140.

Figure 2:
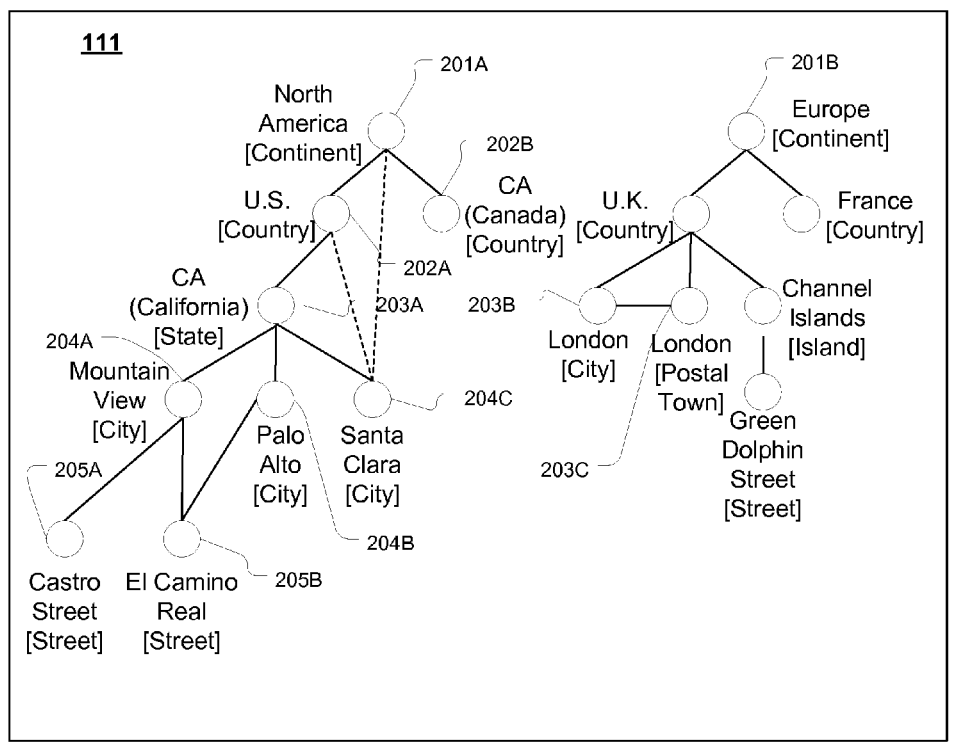
FIG. 2 illustrates a sample set of entities and their relationships to each other in the domain of geographic locations.

More specifically, the geographic database 111 stores data on geographic entities 111A such as streets, cities, states, and countries, along with geographic features, such as bodies of water, parks, mountains, forests, deserts, and so forth, as well as storing their relationships to each other. FIG. 2 illustrates a sample set of entities and their relationships, according to one embodiment. Specifically, FIG. 2 depicts a number of nodes in an entity graph, each node corresponding to a particular geographic entity. For example, nodes 201A and 201B represent the continents of North America and Europe, respectively; node 202 represents the United States (a country); node 203A represents the state of California; node 204A represents Mountain View (a city in California); and node 205A represents the street Castro Street (a street in Mountain View). In practice, the entity graph would be very densely populated, for example with thousands of cities, and millions of entities such as streets and geographic features.

Each geographic entity represents a particular region of the world, such as a large region like a continent or country, or a smaller region such as a particular street, or a geographical feature. Each geographic entity may have associated data demarcating the region that the entity represents, such as a set of 1 km square cells or other regular shapes located partially or entirely within the region, or a set of coordinates defining a boundary of the entity.

Each entity is associated with one or more entity names. The entity name can be its official name such as "New York City", as well as shortened versions thereof, such as "New York" as well as other informal names, such as "Big Apple." Referring again to FIG. 2, the entity names include "Mountain View" for the city entity 204A, or "California" for the state entity 203A, and the names may include one or more abbreviations (e.g., "CA" and "Calif.", as well as "California") and/or multiple language variants (e.g., the French "Californie" and the German "Kaliformien", as well as the English "California"). The names of one entity may be the same as the names of other entities, such as the abbreviation "CA" for both state 203A and country 202B.

Additionally, each geographic entity 111A may have a corresponding type, such as STATE for the entity 203A, CITY for the entity 204A, or the like. The types may be ordered and assigned ranks based on their levels of specificity or typical geographic scope, such as 5 for STREET (most specific, lowest typical geographic scope), 4 for CITY, 3 for STATE, 2 for COUNTRY, and 1 for CONTINENT.

The geographic entities are connected by edges representing relationships such as containment (i.e., one entity being wholly contained within another, such as the city 204A being directly contained within the state 203A and indirectly contained within the country 202A and continent 201A), or overlap (i.e., one entity being partially contained within another, such as the street 205B being partially located within the city 204A and partially within other cities, such as the city 204B). The graph formed by the entities and their relationship edges may contain cycles due to the presence of both containment and overlap relationships, such as the cycle formed by nodes 203A, 204A, 204B, and 205B. The "neighbors" of an entity in the graph are said to be the entities whose corresponding nodes are reachable via a single link. For example, the neighbors of the street 205B are the entities 204A and 204B that it overlaps, as well as the state 203A, country 202A, and continent 201A, that indirectly contain it. (In order to avoid excessive visual clutter, indirect containment links, such as those between street 205B and state 203A or country 202A, are generally not depicted in FIG. 2. Indirect containment links between city 204C and country 202A and continent 201A are depicted for purposes of illustration.)

The data in the geographic database 111 may be created from a variety of sources, such as feeds from various governmental or private geographic databases, or manual creation and/or editing by employees of the organization responsible for the map service 100 or by users of the client devices 150.

Referring again to FIG. 1, the query log 112 stores prior user queries received by the map server 113. A valid query includes an ordered set of names of the entities 111A from the geographic database, and may additionally include punctuation and names not in the geographic database. For example, the query "Castro Street, Mountain View, Calif." comprises a name of the street entity 205A from FIG. 2, followed by a name of the city entity 204A, followed by a name of the state entity 203A, the names being separate by commas.

In one embodiment, the queries from different languages or locales (i.e., different country and language pairings, such as United States English, United Kingdom English, or Canadian French) are stored together in the query log 112. In another embodiment, a separate query log is maintained for each locale, so that each query is stored in the query log for the locale from which it came. Queries from different locales may have different orderings of the various constituent entities. For example, a query for "801 Castro Street, Mountain View, Calif.", when entered in the US (American English) locale, might instead be expressed as "California, Mountain View, 801 Castro Street" when entered in the RU (Russian) locale.

The illustrated components of the map service 100 can be implemented as single or multiple components of software or hardware. In general, functions described in one embodiment as being performed by one component can also be performed by other components in other embodiments, or by a combination of components. Furthermore, functions described in one embodiment as being performed by components of the map service 100 can also be performed by one or more clients 150 in other embodiments if appropriate.

Figure 3:
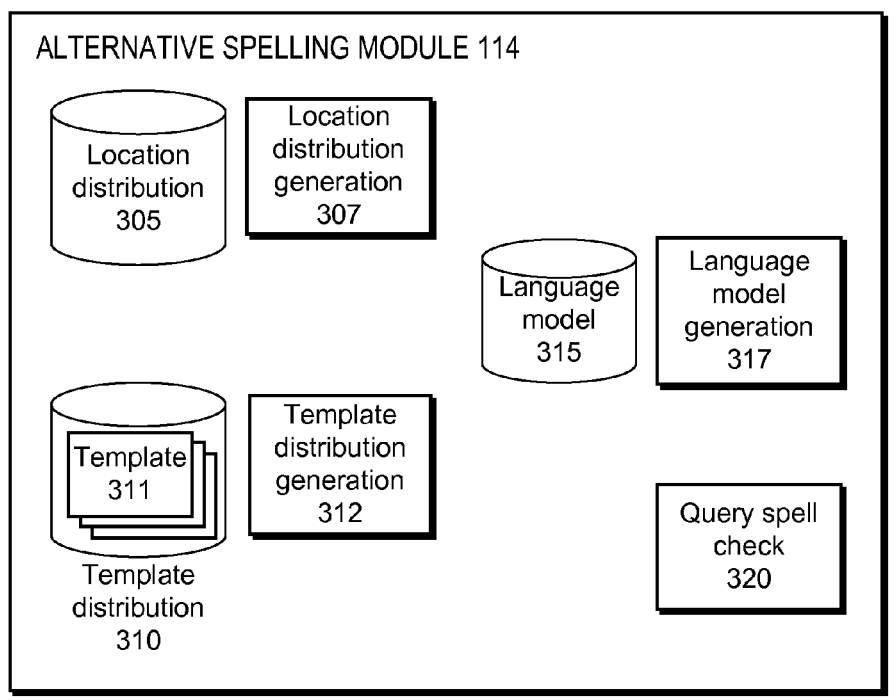
FIG. 3 is a block diagram illustrating the components of an alternative spelling module.

FIG. 3 is a block diagram illustrating the components of the alternative spelling module 114 of FIG. 1, according to one embodiment. The alternative spelling module 114 analyzes the data in the geographic database 111 and one or more query logs 112 and generates a geographic language model. The geographic language model may then be processed to calculate conditional probabilities of various geographic entity names occurring in a geographic query. The conditional probabilities may then be used at runtime to suggest alternative queries for a given user query, e.g., where the user entered a query containing a misspelled entity name.

More specifically, the alternative spelling module 114 includes (a) a template distribution repository 310 that stores for each of a set of orderings of possible query types, a probability that an arbitrary query will match that ordering, and (b) a location distribution repository 305 comprising probabilities that an arbitrary query references the various geographic entities in the geographic database 111. In one embodiment, the template distribution repository 310 is implemented as a file comprising <template, probability> pairs, where template is some representation of the template (e.g., the ordered set of entity types that makes up the template, or a unique identifier thereto), and probability specifies the probability that an arbitrary query will match that template. In one embodiment, the location distribution repository 305 is implemented as a file comprising <entity, probability> pairs, where entity is a unique identifier of the entity in the geographic database 111, and probability is the probability that an arbitrary query will reference the region corresponding to the entity. The alternative spelling module 114 further comprises a language model 315 that stores a set of probable orderings of geographic entity names and an associated score for each, the score being derived by a below-described language model generation module 317.

The alternative spelling module 114 further comprises modules 307, 312, and 317 for generating the data of the location distribution repository 305, template distribution repository 310, and language model 315, respectively. The alternative spelling module 114 optionally further comprises a query spell check module 320 that applies the generated language model 315 to suggest spelling corrections for geographic queries. These components are now described in more detail.

The template distribution generation module 312 generates the template distribution repository 310 from the data in the query log 112. The template distribution repository 310 includes a set of distinct templates, each template representing a particular ordering of different geographic entity types, and each template having an associated probability; the determining of template probability is described below. In one embodiment, the template distribution repository 310 includes one template for each possible ordering of different entity types.

For example, assuming for simplicity that the only geographic entity types were STREET, CITY and STATE, then the possible templates would be:
  <STREET, CITY, STATE>,
  <STREET, STATE, CITY>,
  <STATE, STREET, CITY>,
  <STATE, CITY, STREET>,
  <CITY, STREET, STATE>,
  <CITY, STATE, STREET>,
  <STREET, CITY>,
  <STREET, STATE>,
  <CITY, STREET>,
  <CITY, STATE>,
  <STATE, STREET>,
  <STATE, CITY>,
  <STREET>,
  <STATE>, and
  <CITY>.

In one embodiment, the template distribution repository 310 is derived from queries from all locales. In another embodiment, there is one template distribution for each locale and it is generated solely from queries associated with that locale. In another embodiment, each template is associated with an identifier of one or more locales in which is it applicable, and the <template, locales, probability> tuples are sorted by probability.

For every query in the query log 112 (or some subset thereof), the template distribution generation module 312 identifies the template matching the query based on the various entity types and their ordering. A template is said to match a query (or a query to match a template) if the query has the same entity types as the template, and in the same order. For example, the template distribution generation module 312 matches the query "California Street, Mountain View, Calif." to the template <STREET, CITY, STATE>, since the query consists of a street, followed by a city, followed by a state. The template distribution generation module 312 tracks, for each template, a count of queries matching that template. After all the queries have been matched, the counts are normalized, e.g., by dividing the counts by the total number of queries, thus obtaining, for each template, a probability of an arbitrary query matching that template.

For example, for some sample set of queries, it might be found that 28.2% of queries match the template <ADDRESS, CITY, STATE>, 18.6% of queries match the template <CITY, STATE>, and 7.6% of queries match the template <STATE, CITY, ADDRESS>. In this example, the contents of the template distribution repository 310 would comprise the three entries:

| | |
|---|---|
| <ADDRESS, CITY, STATE> | 28.2% |
| <CITY, STATE> | 18.6% |
| <STATE, CITY, ADDRESS> | 7.6% |

In one embodiment, templates with probabilities below some threshold are removed, since their low calculated probabilities indicate that that particular query template is not used in practice.

The location distribution generation module 307 generates the data of the location distribution repository 305 from the data in the query log 112 and in the geographic database 111. The location distribution comprises probabilities that an arbitrary query refers to the various geographic entities in the domain database.

The location distribution generation module 307 first determines, for every entity 111A in the geographic database 111, which queries from the query log 112 referred to that entity. More specifically, the location distribution generation module 307 identifies, for each entity, queries containing one of the names associated with the entity. Additionally, since names need not uniquely identify an entity—e.g., "CA" can be a name of both the state of California and the country of Canada—the location distribution generation module 307 also determines whether each of the identified queries had results falling within the region represented by the entity. (A query is said to have results falling within the portion of map data viewed by the user issuing the query—e.g., the portion of data displayed on a web page in response to the entry of the geographic query.) If an identified query does have results falling within the region represented by the entity, the module 307 considers the query to refer to the entity and accordingly increments a count for that entity. Once a count for an entity has been tabulated, the location distribution generation module 307 normalizes the count, e.g., by dividing the count for the entity by the total number of queries from the query log 112 that were examined. (In one embodiment, all queries are examined; in other embodiments, only some subset of the queries is examined, such as those for a particular locale(s), or a random sampling of the queries.) This process is repeated for each entity that appears in the database 111.

Thus, the result of the location distribution generation module 307—i.e., the location distribution repository 305—is, for every entity, a probability that an arbitrary query references the region represented by that entity.

The language model generation module 317 generates the language model 315 from the data in the generated location distribution repository 305 and the template distribution repository 310. The language model 315 then can be used as the basis of checking the spelling of a geographic query and suggesting alternative query spellings, for example.

Generally, the language model generation module 317 generates a set of entity name orderings that are likely to occur using the information on entity relationships in the geographic database 111 and the templates 311; it does not generate all theoretically possible orderings. This results in a set of orderings that is practical to store and analyze. The language model generation module 317 then calculates a score for each such ordering, the score being some function of the probability that an arbitrary query would include that ordering.

More specifically, for each entity E in the geographic database 111, the language model generation module 317 identifies the type $T_E$ of the entity, such as STREET, CITY, or the like, e.g., by looking up the type within a corresponding entry of the geographic database. Then, the language model generation module 317 generates a set of types $S_R$ that are related to the type $T_E$—i.e., any type (other than $T_E$ itself) that appears in a template directly after an entity of type $T_E$. Then, the language model generation module 317 generates a set of entities $S_N$ that are neighbors of E in the entity graph and that are of one of the types in $S_R$.

As a simple example of the above steps, assume that the entity E is the street entity 205B of the example of FIG. 2, and the template distribution repository 310 comprises templates <STREET, CITY, STATE> and <STREET, POSTAL_CODE>. For this example, the language model generation module 317 would determine that the type $T_E$ of E is STREET, e.g., by examining an entry corresponding to E in the database 111. The language model generation module 317 would then generate, as the set $S_R$ of related types, the set {CITY, POSTAL_CODE}, since CITY and POSTAL_CODE both follow STREET in one of the templates, but STATE does not. Then, the language model generation module 317 would generate, as the set $S_N$, the set consisting of city entities 204A and 204B, the neighbors of street entity 205B that are also of one of the types in $S_R$ (namely, the CITY type).

Then, using the query templates 311, the language model generation module 317 generates all pairs of names involving a name of E and the names of the entities of $S_N$. Finally, the language model generation module 317 assigns a score to each of the name combinations based on (a) the probability of the template corresponding to the name combination, as stored in the template distribution repository 310, (b) the probability assigned to the area that E represents, as stored in the location distribution repository 305, and (c) the rank or other numerical value associated with of the most specific type of the combination. For example, the three scores could be multiplied together to obtain a weighted probability score.

Continuing the prior example, assume that the street entity 205B has the name "El Camino Real", the city entity 204A has the names "Mountain View" and "Vue Montagne", and the city entity 204B has the name "Palo Alto". Then the set of all unordered pairs of names involving E and the names of the entities in $S_N$ is {"El Camino Real, Mountain View", "El Camino Real, Vue Montagne", "El Camino Real, Palo Alto"}. Then, for example, the name combination "El Camino Real, Mountain View" might be assigned a score by computing the product of (a) the probability of its template <STREET, CITY> as stored in the template distribution repository 310, (b) the probability assigned to the street entity 205B in the location distribution repository 305 (quantifying the likelihood that an arbitrary query will be targeting that particular street), and (c) the rank of the STREET type (e.g. 5, denoting that STREET is more specific than CITY, STATE, COUNTRY, and CONTINENT, for example).

In summary, the score for a given name combination (e.g., "El Camino Real, Mountain View") is:

$$P(T(Q))*P(L(Q))*R(Q)$$

where P(T(Q)) represents the probability of the template matching the query Q, P(L(Q)) represents the probability that a query references the location described by Q, and R(Q) represents the rank value assigned to the most specific entity in the query.

The optional query spell check module 320 uses the language model 315 generated by the language model generation module to identify, for a given user-submitted query, alternative queries that are more likely what the user intended. In one embodiment, for a query Q composed of a set of words $w_1, w_2, \ldots w_N$, the query spell check module 320 computes the probability of Q as the product of the conditional probabilities of each word, i.e., $Pr(Q)=Pr(w_1)*Pr(w_2|w_1)* \ldots * Pr(w_N|w_1, w_2, \ldots w_{N-1})$. Thus, the conditional probabilities are required to compute the probability of the query.

In order to learn the conditional probabilities, a preprocessing portion of the query spell check module 320 analyzes the language model 315. In one embodiment, the preprocessing portion treats the language model itself as a document corpus. This is possible because the language model can be considered a large set of valid sentences in the form of geographic queries. A phrase corresponding to each pair of names (e.g., "El Camino Real, Mountain View") serves as a valid sentence, and the frequency of occurrence of each phrase may be determined based on its associated score, e.g., with the phrase with the lowest score occurring once, and a phrase having a score that is N times greater than the lowest score occurring N times. The various conditional probabilities can then be learned by analyzing this derived document corpus using statistical algorithms known to those of skill in the art. For example, one algorithm divides each entry in the language model into tokens, such as individual word tokens. The tokenization may be language-specific, and is typically based on the presence of space characters. Each distinct token-ngram (i.e., n tokens, for some integer n) is then counted by incrementing an associated count each time that the token-ngram is found in the set of tokens. For example, for the phrase "El Camino Real, Mountain View", each of the token-unigrams "El", "Camino", "Real", "Mountain", and "View" has its count incremented, as do the token-bigrams <"el" "camino"><"camino" "real">, <"real" "mountain"> and <"mountain" "view">. The token-3-grams, token-4-grams, and token-5-grams are incremented in a similar manner. The counts are then normalized based on the total number of counts for all the token-ngrams. Then, when computing the conditional probabilities, Pr(w2|w1) can be computed as Pr(w1 w2)/Pr(w1), where Pr(w1 w2) is a token-bigram probability and Pr(w1) is a token-unigram probability.

The conditional probabilities are used at runtime by the query spell check module 320 to suggest alternative, more likely queries. This module receives queries—e.g., from the map server 113 of FIG. 1—and generates a set of variants of the query. For example, the runtime portion might apply edit rules that are based on past observance of user spelling corrections, such as a rule transforming the substring "aams" to "ams", each application of an edit rule generating a variant of the original query. In one embodiment, each locale has its own set of edit rules. Then, the probability of each variant is computed by calculating the product of the conditional probabilities as described above, each of the conditional probabilities having previously been derived by the preprocessing portion of the query spell check module 320 from the language model 315. Some or all of the variants with probabilities higher than the user-submitted query may then be presented to the user as alternative queries to be executed.

Figure 4:
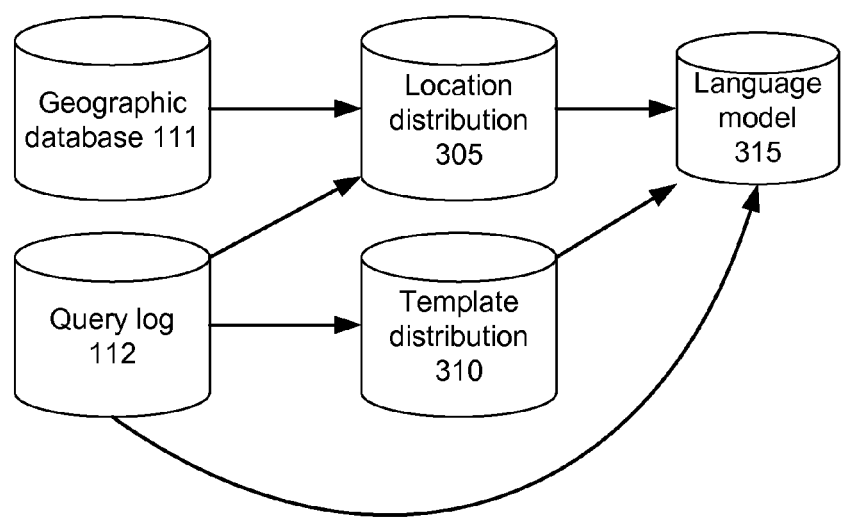
FIG. 4 is a data flow diagram representing the relationships and derivations of the various types of data analyzed and/or produced by the alternative spelling module.

FIG. 4 is a data flow diagram representing the relationships and derivations of the various types of data analyzed and/or produced by the alternative spelling module 114, according to one embodiment. The geographic database 111 and the query log 112 of the map service 100 act as input for the alternative spelling module 114. The alternative spelling module 114 generates the template distribution repository 310 based on the contents of the query log 112, and generates the location distribution repository 305 based both on the contents of the query log and on the contents of geographic database 111. The alternative spelling module 114 then in turn generates the language model 315 based on the contents of the location distribution repository 305 and the template distribution repository 310.

As described above, the language model 315 may then be used to calculate the conditional probabilities of various geographic entity names occurring in a query, and the conditional probabilities in turn can be used to compute scores for arbitrary geographic queries. The scores can then be used to suggest, for a given geographic query, alternative queries with different spellings that are more probable than the query as originally submitted.

Although the foregoing description has provided examples for the domain of geographic queries, it is appreciated that the disclosed techniques are broadly applicable to structured data from different domains, and are not limited to use with geographic queries. For example, the inventive techniques could also be applied for generating alternative spellings of names of people, e.g. suggesting "Adams, John Q" as a more probable alternative spelling for the query "Adams, Jonh Q" when seeking information on a person. Other applications include fields in which complex terminology or language is frequently employed, such as in medicine, biology, chemistry, and pharmaceuticals.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating a geographic language model for computing probabilities of occurrence of geographic queries, comprising:
   accessing a geographic database comprising:
      a plurality of geographic entities, each geographic entity corresponding to a geographic region and having one or more names and an entity type, and
      a plurality of links between pairs of the geographic entities;
   accessing a query log comprising geographic queries previously entered by users, a plurality of the geographic queries including names of ones of the geographic entities in the geographic database;
   generating, from the query log, a template distribution quantifying probabilities that entity types of the geographic entities named in the geographic queries correspond to ones of a plurality of query templates, each query template comprising an ordered set of the entity types appearing in the geographic database;
   generating a geographic distribution from the query log quantifying probabilities of queries in the query log referencing ones of the geographic entities in the geographic database;
   generating the geographic language model from the template distribution and the geographic distribution, the geographic language model comprising a set of combinations of names of the geographic entities and associated scores, the scores based on probabilities of occurrence of the combinations in a geographic query; and
   storing the geographic language model on a computer readable storage device.

2. The computer-implemented method of claim 1, further comprising computing conditional probabilities of occurrence of words in geographic queries based at least in part on the geographic language model.

3. The computer-implemented method of claim 2, further comprising:
   receiving a geographic query from a user;
   generating an alternative geographic query that is a variant of the received geographic query;
   computing a probability of occurrence of the received geographic query and a probability of occurrence of the alternative geographic query based at least in part on the computed conditional probabilities; and
   responsive to the probability of occurrence of the alternative geographic query being higher than the probability of occurrence of the received geographic query, providing the alternative geographic query to the user as an alternative query.

4. The computer-implemented method of claim 1, wherein generating the geographic language model further comprises:
   for a pair of names comprising a name of a first geographic entity and a name of a second geographic entity corresponding to a geographic region that includes the first geographic entity, computing a score for the pair using:
      a probability of a template of the template distribution corresponding to the pair; and
      a probability of the geographic distribution corresponding to the first geographic entity.

5. The computer-implemented method of claim 1, wherein generating the template distribution comprises:
   identifying, for each of a plurality of the geographic queries in the query log, a corresponding one of the query templates; and
   determining, for each distinct query template, a count of the plurality of the geographic queries that correspond to the template.

6. The computer-implemented method of claim 1, wherein generating the geographic distribution comprises, for each entity of a plurality of the geographic entities:
   identifying queries comprising one of the names associated with the entity; and
   counting, within the identified queries, queries having results falling within the geographic region corresponding to the entity.

7. The computer-implemented method of claim 4, wherein generating the geographic language model further comprises:
   receiving the name of the first geographic entity from the geographic database;
   identifying a type of the first geographic entity;
   identifying a set of related types, the related types comprising entity types that appear in the geographic database adjacent to the first geographic entity;
   identifying a set of neighboring geographic entities in the geographic database, each neighboring geographic entity having a link between the neighboring geographic entity and the first geographic entity, and having a type that is included in the set of related types; and
   generating a set of pairs of the name of the first geographic entity and the names of the entities in the set of neighboring geographic entities.

8. The computer-implemented method of claim 7, wherein generating the geographic language model further comprises computing a score for each of the generated pairs.

9. The computer-implemented method of claim 8, wherein the score for a generated pair is based on a probability of a template of the template distribution corresponding to the pair.

10. The computer-implemented method of claim 8, wherein the score for a generated pair is based on a probability of an entity in the geographic distribution corresponding to the first geographic entity.

11. The computer-implemented method of claim 8, wherein the score for a generated pair is based on a rank of the type of the first geographic entity.

12. The computer-implemented method of claim 1, wherein each geographic entity is associated with data demarcating the geographic region corresponding to the geographic entity.

13. The computer-implemented method of claim 1, wherein at least one of the geographic entities has a plurality of names comprising at least two names selected from the group consisting of an official name, an informal name, an abbreviated name, and two or more language variants of a name.

14. A non-transitory computer-readable storage medium having executable computer program instructions embodied therein for generating a language model for analyzing probabilities of occurrence of text strings in a given domain, actions of the computer program instructions comprising:
   accessing a geographic database comprising:
      a plurality of geographic entities, each geographic entity corresponding to a geographic region and having one or more names, and
      a plurality of links between pairs of the geographic entities;
   accessing a query log comprising geographic queries previously entered by users, a plurality of the geographic queries including names of ones of the geographic entities in the geographic database;
   generating, from the query log, a template distribution quantifying probabilities that entity types of the geographic entities named in the geographic queries correspond to ones of a plurality of query templates, each query template comprising an ordered set of the entity types appearing in the geographic database;
   generating a geographic distribution from the query log quantifying probabilities of queries in the query log referencing ones of the geographic entities in the geographic database;
   generating the geographic language model from the template distribution and the geographic distribution, the geographic language model comprising a set of combinations of names of the geographic entities and associated scores, the scores based on probabilities of occurrence of the combinations in a geographic query; and
   storing the geographic language model on a computer readable storage device.

15. The non-transitory computer-readable storage medium of claim 14, the actions further comprising:
   computing conditional probabilities of occurrence of words in geographic queries based at least in part on the geographic language model;
   receiving a geographic query from a user;
   generating an alternative geographic query that is a variant of the received geographic query;
   computing a probability of occurrence of the received geographic query and a probability of occurrence of the alternative geographic query based at least in part on the computed conditional probabilities; and
   responsive to the probability of occurrence of the alternative geographic query being higher than the probability of occurrence of the received geographic query, providing the alternative geographic query to the user as an alternative query.

16. The non-transitory computer-readable storage medium of claim 14, wherein generating the geographic language model further comprises:
   receiving a name of a first geographic entity from the geographic database;
   identifying a type of the first geographic entity;
   identifying a set of related types, the related types comprising entity types that appear in the geographic database adjacent to the first geographic entity;
   identifying a set of neighboring geographic entities in the geographic database, each neighboring geographic entity having a link between the neighboring geographic entity and the first geographic entity, and having a type that is included in the set of related types; and
   generating a set of pairs of the name of the first geographic entity and the names of the entities in the set of neighboring geographic entities.

17. The non-transitory computer-readable storage medium of claim 16, wherein generating the geographic language model further comprises computing a score for each of the generated pairs based on at least one of:
   a probability of a template of the template distribution corresponding to the pair;
   a probability of the geographic distribution corresponding to the first geographic entity; and
   a rank of the type of the first geographic entity.

18. A computer-implemented method for generating a geographic language model for analyzing probabilities of occurrence of geographic queries, the method comprising:
   accessing a geographic database comprising:
      a plurality of geographic entities, each geographic entity corresponding to a geographic region and having one or more names, and
      a plurality of links between pairs of the geographic entities;
   accessing a query log comprising a plurality of geographic queries previously entered by users, a plurality of the geographic queries including names of ones of the geographic entities in the geographic database;
   generating, from the query log, a template distribution quantifying probabilities that entity types of the geographic entities named in the geographic queries correspond to ones of a plurality of query templates, the generating comprising:
      identifying, for each of a plurality of the geographic queries in the query log, a query template comprising an ordered set of the entity types appearing in the geographic database, and
      determining, for each distinct query template, a probability that the arbitrary user query corresponds to the template;
   generating a geographic distribution from the query log quantifying probabilities of queries in the query log referencing ones of the geographic entities in the geographic database, comprising:
      identifying queries comprising one of the names associated with one of the entities, and which have results falling within the geographic region corresponding to the entity; and
   generating the geographic language model using the template distribution and the geographic distribution, the geographic language model comprising a set of orderings of names of the geographic entities and associated scores, the scores based on probabilities of occurrence of the orderings in a geographic query.

19. The computer-implemented method of claim 18, wherein generating the geographic language model comprises:
   receiving a name of a first geographic entity from the geographic database;

identifying a type of the first geographic entity;
identifying a set of related types, the related types comprising entity types that appear in the geographic database adjacency to the first geographic entity;
identifying a set of neighboring geographic entities in the geographic database, each neighboring geographic entity having a link between the neighboring geographic entity and the first geographic entity and having a type that is included in the set of related types;
generating a set of pairs of the name of the first geographic entity and the names of the entities in the set of neighboring geographic entities; and
for each of the generated pairs, computing a score for the pair based at least in part on:
- a probability of a template of the template distribution corresponding to the pair;
- a probability of the geographic distribution corresponding to the first geographic entity; and
- a rank of the type of the first geographic entity.

20. The computer-implemented method of claim 18, further comprising:
computing conditional probabilities of occurrence of words in geographic queries based at least in part on the geographic language model;
receiving a geographic query from a user;
generating an alternative geographic query that is a variant of the received geographic query;
computing a probability of occurrence of the received geographic query and a probability of occurrence of the alternative geographic query based at least in part on the computed conditional probabilities; and
responsive to the probability of occurrence of the alternative geographic query being higher than the probability of occurrence of the received geographic query, providing the alternative geographic query to the user as an alternative query.

* * * * *